US006747278B1

(12) United States Patent
Campione

(10) Patent No.: US 6,747,278 B1
(45) Date of Patent: Jun. 8, 2004

(54) RADIATION DETECTOR UTILIZING AN UNREGULATED POWER SUPPLY

(76) Inventor: Anthony P. Campione, 32 Jones St. 2D, New York, NY (US) 10014

( * ) Notice: Subject to any disclaimer, the term of this patent is extended or adjusted under 35 U.S.C. 154(b) by 33 days.

(21) Appl. No.: 10/166,485

(22) Filed: Jun. 10, 2002

(51) Int. Cl.[7] .................................................. G01T 1/00
(52) U.S. Cl. ......................... 250/387; 250/388; 250/389
(58) Field of Search ................................. 250/387, 374, 250/336.1, 388, 389, 475.2

(56) References Cited

U.S. PATENT DOCUMENTS

| 4,197,461 A | 4/1980 | Umbarger et al. |
| 4,229,733 A | 10/1980 | Tulenko et al. |
| 4,695,730 A | 9/1987 | Noda et al. |
| 4,772,793 A * | 9/1988 | Larson et al. ................ 250/374 |
| 4,963,747 A | 10/1990 | Thacker |
| D325,171 S | 4/1992 | Laffaille |

FOREIGN PATENT DOCUMENTS

DE          292110 A  *  7/1991  ............ H01J/47/08

* cited by examiner

*Primary Examiner*—Constantine Hannaher
*Assistant Examiner*—Otilia Gabor
(74) *Attorney, Agent, or Firm*—Richard L. Miller

(57) ABSTRACT

A radiation detector that utilizes an unregulated power supply as opposed to a regulated power supply, since quantitative results are not required, only an audible signal, and an unregulated power supply is less expensive than that of a regulated power supply. The radiation detector includes a Geiger-muller tube, a nine volt DC power supply, a solid state oscillator with an output of 2 kilohertz, a high voltage power supply, and an audio amplifier.

18 Claims, 1 Drawing Sheet

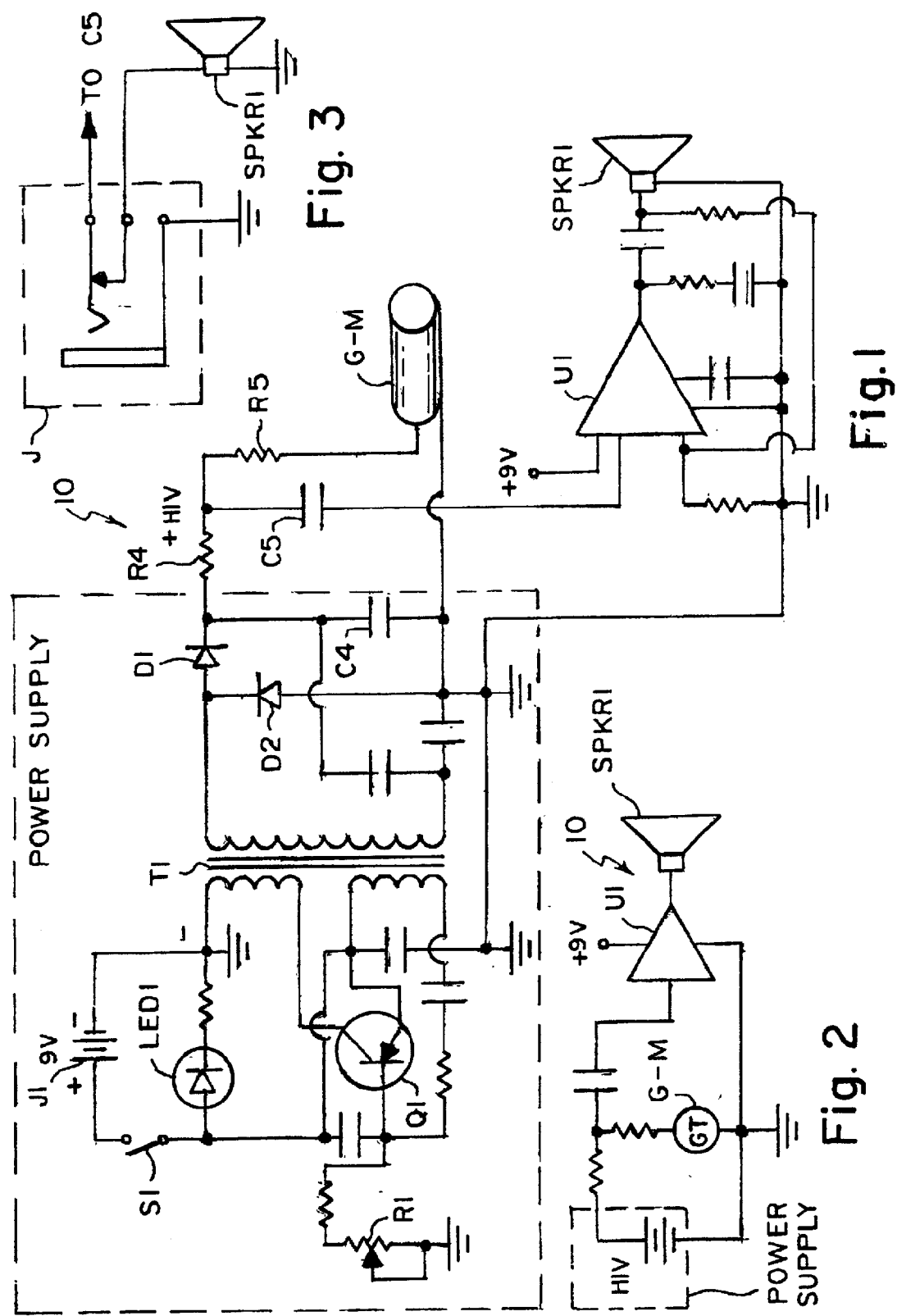

RADIATION DETECTOR UTILIZING AN UNREGULATED POWER SUPPLY

BACKGROUND OF THE INVENTION

1. Field of the Invention

The present invention relates to a radiation detector. More particularly, the present invention relates to a radiation detector utilizing an unregulated power supply.

2. Description of the Prior Art

Nuclear contamination can stalk the land, leaving little indication of its presence until it is too late. Radiation is a silent phantom-like killer, in that it's usually not visible and is never audible.

If the area one lives in has been defiantly identified as a contaminated area, one may Just up and leave, taking one's family and all one's worldly possessions with them. In doing, however, one must also know whether one is carrying away contamination that might possibly harm one and one's household over a period of time. It could be in one's clothing, in one's hair, on one's body, and even inside one's body. One has to seek it out and then work on the problem of separating it from one's body before its has a chance to do serious damage.

If one lives in an area where nuclear contamination is a definite possibility, then one may have considered purchasing one of the store brought Geiger counters, retailing for at least $400, which can communicate exact amounts of radiation, in calibrated units, present within a given area either by means of an analog or digital readout.

The sensing device used in radiation detectors is something called a Geiger muller tube. Recently, the manufactures of the Geiger muller tube developed a version that is small and economically priced at $58.

Numerous innovations for radiation detectors have been provided in the prior art that will be described. Even though these innovations may be suitable for the specific individual purposes to which they address, however, they differ from the present invention.

A FIRST EXAMPLE, U.S. Pat. No. 4,197,461 to Umbarger et al. teaches a miniaturized radiation chirper for use with a small battery supplying on the order of 5 volts. A poor quality CdTe crystal which is not necessarily suitable for high resolution gamma ray spectroscopy is incorporated with appropriate electronics so that the chirper emits an audible noise at a rate that is proportional to radiation exposure level. The chirper is intended to serve as a personnel radiation warning device that utilizes new and novel electronics with a novel detector, a CdTe crystal. The resultant device is much smaller and has much longer battery life than existing chirpers.

A SECOND EXAMPLE, U.S. Pat. No. 4,229,733 to Tulenko et al., teaches an exposure detecting device comprising a radiation detector means providing an output signal responsive to the intensity of received ultraviolet radiation, a storage means receiving the output signal of said detector means and providing an output signal which increases as a function of the signal received and its duration, and decreases in the absence of a received signal as a predetermined function of time. A sensitivity control means provides a reference signal, and comparing means receives the output signal of said storage means and the reference signal of said sensitivity control means and delivers an output signal when the storage means output signal exceeds a predetermined value with respect to the reference signal. Alarm means is activated upon receiving an output signal from said comparing means providing an alarm.

A THIRD EXAMPLE, U.S. Pat. No. 4,695,73 to Noda et al. teaches a local radiation exposure alarm having a radiation detector used in the course of operations in nuclear power plant, a radiotherapeutic center for treatment for cancer, etc., a preamplifier for transmitting with an excellent S/N ratio a detected output signal from said detector, and a measuring unit measuring an exposure and provided with an alarm operating when the exposure exceeds a set permissible dose, and in which these detector, preamplifier and measuring unit are connected together electrically. The detector unit is shaped in a ring to be set on a finger or a toe, has a semiconductor element highly sensitive to radiation such as gamma rays incorporated therein so as to be sufficiently protected from vibrations and moisture, and is connected to the preamplifier unit through a lead wire. The preamplifier unit is provided with a fitting easy to set on and remove from an arm or the like and is connected electrically to the measuring unit also through a lead wire, and the measuring unit has a display and the alarm. The preamplifier unit has a space for holding the detector therein, and the measuring unit has a space for holding the preamplifier with the detector.

A FOURTH EXAMPLE, U.S. Pat. No. 4,963,747 to Thacker teaches an ionizing radiation detector which is based on the principle of analog electric integration of radiation sensor currents in the sub-pico to nano ampere range between fixed voltage switching thresholds with automatic voltage reversal each time the appropriate threshold is reached. The thresholds are provided by a first NAND gate Schmitt trigger which is coupled with a second NAND gate Schmitt trigger operating in an alternate switching state from the first gate to turn either a visible or audible indicating device on and off in response to the gate switching rate which is indicative of the level of radiation being sensed. The detector can be configured as a small, personal radiation dosimeter which is simple to operate and responsive over a dynamic range of at least 0.01 to 1000 R/hr.

A FIFTH EXAMPLE, U.S. Pat. No. 5,045,700 to Crowson et al. teaches a visual display for indicating a level of ionizing radiation that is mounted on a portion of an item of headwear, such as safety goggles, at a position within the peripheral field of vision of a wearer. Such a display advises a wearer of a level of radiation, including warning levels, in real time without requiring activity on the part of the wearer. In one embodiment, an ionizing radiation detector, accompanying circuitry, and the visual display are mounted on the glasses, such as on the frame. In another embodiment, a commercially-available detector is used to provide an output from a location remote from the headwear to actuate the visual display on the headwear. Various circuit embodiments are also disclosed.

A SIXTH EXAMPLE, U.S. Pat. No. Des. 325,171 to Laffaille teaches the ornamental design for a personal dosimeter badge.

It is apparent that numerous innovations for radiation detectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

The present invention is an electronic blood hound that sniffs out radiation in and around one's home.

If one lives in an area in which nuclear accident is likely to occur, perhaps in close proximity to Three Mile Island, and is concerned that radiation could contaminate life essentials, such as water, food, and air supply, the present invention can restore some degree of security to one's existence by alerting one to contamination.

The present invention will sniff out the source of contamination and bark its warning to indicate the presence of radiation. Needless to say such a device, under some circumstances, can mean the difference between life and death.

If, however, like the average citizen one is more concerned with knowing where the contamination is then one is with knowing how much, then the present invention can certainly handle that task.

If a nuclear emergency does occur, one can feel secure in knowing that one is prepared to deal with it in one's own small way with the radiation detector of the present invention.

ACCORDINGLY, AN OBJECT of the present invention is to provide a radiation detector utilizing an unregulated power supply that avoids the disadvantages of the prior art.

ANOTHER OBJECT of the present invention is to provide a radiation detector utilizing an unregulated power supply that is simple and inexpensive to manufacture.

STILL ANOTHER OBJECT of the present invention is to provide a radiation detector utilizing an unregulated power supply that is simple to use.

BRIEFLY STATED, STILL YET ANOTHER OBJECT of the present invention is to provide a radiation detector that utilizes an unregulated power supply as opposed to a regulated power supply, since quantitative results are not required, only an audible signal, and an unregulated power supply is less expensive than that of a regulated power supply. The radiation detector includes a Geiger-muller tube, a nine volt DC power supply, a solid state oscillator with an output of 2 kilohertz, a high voltage power supply, and an audio amplifier.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a schematic diagram of the circuit of the present invention;

FIG. 2 is a simplified schematic diagram of the circuit of the present invention shown in FIG. 1 with the power supply of FIG. 1 being shown simplified; and FIG. 3 is schematic diagram to connect an optional Jack that will automatically connect and disconnect the speaker whenever a plug is inserted.

LIST OF REFERENCE NUMERALS UTILIZED IN THE DRAWING 10 radiation detector utilizing an unregulated power supply of present invention
C4 first capacitor—0.005 µF, 1000 WVDC ceramic disc
C5 second capacitor—50 pf, 1000 WVDC ceramic disc
D1 first diode—IN4007 1-A, 1000 PIV
D2 second diode—IN4007 1-A, 1000 PIV
G-M Geiger-muller tube
J Jack
J1 power Jack—RS 276–1567
LD1 light emitting diode—Jumbo red
Q1 power transistor—2N3055—RS 276–2041
R1 trimmer potentiometer—½ watt, 5% unit, 1000 ohm, 15 turn
R4 second resistor—470,000 ohm, ½ watt, 5% unit
R5 first resistor—4,700,000 ohm (4.7 mega ohms), ½ watt, 5% unit
S1 power switch—single pole, single throw subminiature toggle
switch—RS 275–662
SPKR1 loud speaker—8 ohm 500 mW loudspeaker—RS 400–245
T1 step-up transformer—117 volt AC primary to 24-volt AC, 450 mA center tapped secondary—RS-273–1366
U1 audio amplifier—LM386 integrated circuit—RS 276–1731

DETAILED DESCRIPTION OF THE PREFERRED EMBODIMENT

Referring now to FIGS. 1–3, in which like numerals indicate like parts, the radiation detector utilizing an unregulated power supply of the present invention is shown generally at 10.

The radiation detector utilizing an unregulated power supply 10 comprises a Geiger-muller tube, a nine volt DC power supply, a solid state oscillator with an output of 2 kilohertz, a high voltage power supply, and an audio amplifier. The power supply can be as simple as six batteries connected in series for portability and stationary use or can be a wall mounted power pack.

A Transistor Q1, which is configured as a variation of a Hartley oscillator, generates a low voltage AC signal. The low voltage AC signal is fed across a primary of a step-up transformer T1, creating a rising and collapsing field which is in turn inductively transferred to a secondary of the transformer T1 as high-voltage AC. The voltage at the secondary of transformer T1 is fed through a first diode D1 and a second diode D2. The first diode D1 and the second diode D2 form a voltage doubler/full-wave rectifier to provide an extra boost to the output voltage. The magnified/rectified voltage is then filtered by a first capacitor C4 into 500 volts DC, which is then fed to a Geiger-muller tube G-M that has a window.

Inside the tube G-M is a gas that ionizes, i.e. conducts, whenever a pulse of radiation enters the window of the tube G-M. Each pulse causes a brief voltage drop across a 4,700,000 ohm first resistor R5. A second capacitor C5 passes that pulse into an audio amplifier U1 which in turn sends its amplified output to a loud speaker SPKR1, whereits converted into a pulse of sound.

The 500 volts DC on the tube G-M is not regulated. It will drop slightly whenever the tube G-M is busy, but that wont have a noticeable effect on the sound one hears. The transistor Q1 is capable of dissipating up to 115 watts of power and hums along at ten percent of that maximum and doesn't need a heat sink. A trimmer potentiometer R1 in Q1's base circuit varies the oscillator's frequency just enough so that one can get 500 volts DC for the tube G-M at the point where a second resister R4 and the second capacitor C5 join.

The transformer T1 must be a center tapped 24-volt unit capable of handling at least 450 milliamps of current. A different one may not work at all, or worse, it could put out too much voltage and burn up the G-M tube.

The audio amplifier U1 is a LH386, which is an 8-pin chip that saves lots of assembly time and is capable of driving 400 milliwatte of audio power into a 500 milliwatt 8-ohm loudspeaker.

Included in the circuit is a bass-boost which is used to emphasize the low-frequency pulses and to de-emphasize the high-frequency components of the 2-kHz oscillator that might otherwise leak through to the audio amplifier.

The loud speaker SPKR1 can be any 500-mW unit that should be protected from damage by covering it with a wire screen or perhaps a grille.

A pair of low impedance earphones from a portable FM-radio headset can be used as a substitute for the loud speaker SPKR1. No one else, however, will be able to hear the radiation pulses except the wearer of the headphones, so one may want to use a normal through jack J, also called a closed-circuit Jack by hobbyists. When an earphone plug is inserted into the Jack J, the audio signal is rerouted to the earphones, and when removed, the signal is once again fed to the loud speaker SPKR1.

FIG. 3 illustrates how to connect such a Jack J. As shown, the loud speaker SPKR1 is connected to the circuit. But when the plug is inserted into the Jack J, the loud speaker SPKR1 is disconnected and the audio signal is re-routed through the earphones.

The radiation detector utilizing an unregulated power supply 10 can be built using a construction method of preference—printed circuit, perfboard with point-to-point wiring, or pre-etched experimenter board- and. components laid out in an arrangement most convenient to the builder.

Start by placing the IC socket and other components on the board and securing them in place by temporally bending the leads. Use short lengths of insulated wire to make the Interconnection between components, beginning with the passive components connected to the IC socket. Note that the light emitting diode LED1, the SPKR1, the power switch S1, and the power Jack J1 are mounted on the front panel of the housing. Accordingly, those parts are put aside until the board components have been installed and the work checked for correctness.

After completion of the board, the board is put to the side and work on the panel mounted components is begun. First, drill and cut appropriate size holes in the panel to accommodate the parts. For the speaker hole, depending on what the cabinet is made of, metal, plastic, etc. one may be able to use a hole cutter, like those used by locksmiths.

After cutting the holes, mount components. Be careful when soldering to the light emitting diode LED1. While it can withstand quite a bit of heat for a semiconductor, it is nonetheless, thermal sensitive. Once that's complete, the next thing is the housing for the tube G-M.

An old microphone case has plenty of room inside, once the on-off switch is removed. Radio Shack sells a microphone for $7. Remove the dynamic mike element and the on/off switch, and very carefully place the tube G-H behind the front grill.

The tube G-M itself is small, measuring only 0.59 inches in diameter and 2.12 inches in length. Pack some plastic foam into the space behind it so that nothing rattles around, after you've soldered the cable's center conductor and shield to the tube G-M. For added protection, surround the tube G-M in silicone within the microphone housing.

When assemblage of all the parts on the perforated board is complete, make connections from the board to the panel-mounted components, and make absolutely sure that there are no shorts or opens in the 9-volt power supply circuit.

You'll need to obtain a harmless source of radiation for test purposes. Every good radiation detector carries one for quick tests.

Obtain an alarm clock face with luminous paint on it. The luminous paint is a radioactive compound of radium. Tie a 12-inch length of string or nylon cord to the dial face, and anchor it to the carrying handle on your chassis box.

Before the cabinet is closed, hook up the internal 9-volt DC source. AdJust the trimmer potentiometer R1 until 500 volts DC is measured at the Junction of the second resister R4, the first resistor R5, and the second capacitor C5. Do not allow the voltage fed to the tube G-H to remain higher than 550 volts for very long. Such will shorten its life. The voltage fed to the tube G-M must fall within the range of 490 and 550 volts. The tube G-M won't work at any voltage higher than the recommended 550 volts.

After the tube G-H feed has been set at 500 volts, remove the batteries and plug in the 9-volts, remove the batteries and plug in the 9 volt adaptor for external DC power. Make sure that the positive and negative polarity is wired in correctly. The adaptor will put out a slightly higher voltage than the batteries do, so the 500 volt setting now reads 530 volts. Set the audio volume control for 90% of maximum and close up the cabinet for the final check out of the radiation detector 10.

To operate the radiation detector 10 turn it on and give it 10 seconds to charge up. Place the clock's dial face about one inch away from the window of the tube G-M tube. A good volume of sound should come from the loudspeaker SPKR1 if the cabinet is closed up.

To get a working idea about the effective range of radiation, collect a few insulators, such as a sheet of paper, a piece of lead plate, a piece of aluminum, all three should be Just big enough to cover the dial face, and make a laboratory type test. Keep the dial face always separated from the tube G-M face by one inch space.

A radiation count of about 5000 counts per minute should be heard. Now place the paper insulator between the two and notice the slightly reduced radiation count. Replace the paper insulator with the piece of lead plate. Notice how much more reduction is made by the lead plate than was made by the paper. Then replace the lead plate with the aluminum plate. Notice that the aluminum is not as good as insulator as lead, but it is much better than the paper as an insulator. Naturally, the thicker the metal plate the greater its insulating quality.

While still testing, notice that the Inverse Square Law is at work. That means, doubling the distance between the tube G-M and the source of radiation re the radiation count by 75% not 50%. So the best insulator that can had between you and the contamination is plenty of distance.

It will be understood that each of the elements described above, or two or more together, may also find a useful application in other types of constructions differing from the types described above.

While the invention has been illustrated and described as embodied in a radiation detector utilizing an unregulated power amply, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A radiation detector, comprising:

a) a Geiger-muller tube;

b) a nine volt DC power supply;

c) a solid state oscillator;

d) a high voltage power supply; and e) an audio amplifier;

wherein said Geiger-muller tube is operatively connected to at least one other component of said detector;

wherein said nine volt DC power supply is operatively connected to at least one other component of said detector;

wherein said solid state oscillator is operatively connected to at least one other component of said detector;

wherein said high voltage power supply is operatively connected to at least one other component of said detector;

wherein said audio amplifier is operatively connected to at least one other component of said detector;

wherein said Geiger-muller tube has a window;

wherein said solid state oscillator has an output;

wherein said output of said solid state oscillator is 2 kilohertz;

wherein said high voltage power supply is an unregulated high voltage power supply; and wherein said audio amplifier has a frequency.

2. The detector as defined in claim 1, wherein said nine volt DC power supply is six batteries connected in series for portability and stationary use.

3. The detector as defined in claim 1, wherein said nine volt DC power supply is a wall mounted power pack.

4. The detector as defined in claim 1, wherein a transistor is configured as a variation of a Hartley oscillator;

wherein said transistor has a base circuit;

wherein said transistor generates a low voltage AC signal; and wherein said low voltage AC signal is fed across a primary of a step-up transformer creating a rising and collapsing field which is in turn inductively transferred to a secondary of said transformer as high-voltage AC.

5. The detector as defined in claim 4, wherein said high-voltage AC at said secondary of said transformer is fed through a first diode and a second diode.

6. The detector as defined in claim 5, wherein said first diode and said second diode form a voltage doubler/full-wave rectifier; and wherein said voltage doubler/full-wave rectifier provides an extra boost to said high-voltage AC so as to form a magnified/rectified voltage.

7. The detector as defined in claim 6, wherein said magnified/rectified voltage is filtered by a first capacitor into 500 volts DC; and wherein said 500 volts DC is fed to said Geiger-muller tube.

8. The detector as defined in claim 7, wherein inside said Geiger-muller tube is a gas that ionizes/conducts whenever a pulse of radiation enters said window of said Geiger-muller tube.

9. The detector as defined in claim 8, wherein each said pulse causes a brief voltage drop across a 4,700,000 ohm resistor.

10. The detector as defined in claim 9, wherein a second capacitor passes said pulse into said audio amplifier;

wherein said audio amplifier sends its amplified output to a loud speaker; and wherein said amplified output is converted into a pulse of sound.

11. The detector as defined in claim 10, wherein a trimmer potentiometer in'said base circuit of said transistor varies said frequency of said oscillator just enough so as to allow for 500 volts DC for said Geiger muller tube at a point where a resistor and said second capacitor join.

12. The detector as defined in claim 10, wherein said loud speaker is a 500-mW loud speaker.

13. The detector as defined in claim 10, further comprising a normal through jack;

further comprising a headset;

wherein said headset has a pair of earphones;

wherein said pair of earphones have an earphone plug;

wherein an audio signal is rerouted to said pair of earphones when said earphone plug is inserted into said normal through jack; and wherein said audio signal is fed to said loud speaker when said earphone plug is removed from said normal through jack.

14. The detector as defined in claim 4, wherein said transistor is capable of dissipating up to 115 watts of power;

wherein said transistor operates at ten percent of its maximum; and wherein said transistor doesn't need a heat sink.

15. The detector as defined in claim 4, wherein said transformer is a center tapped 24-volt unit; and wherein said transformer is capable of handling at least 450 milliamps of current.

16. The detector as defined in claim 7, wherein 500 volts DC on said Geiger muller tube is not regulated; and wherein said 500 volts DC drops slightly whenever said Geiger muller tube is busy, but provides no noticeable effect on sound one hears.

17. The detector as defined in claim 1, wherein said audio amplifier is an 8-pin chip that saves lots of assembly time; and wherein said audio amplifier is capable of driving 400 milliwatts of audio power into a 500 milliwatt 8-ohm loudspeaker.

18. The detector as defined in claim 1, wherein a bass-boost is used to emphasize low-frequency pulses and to de-emphasize high-frequency components of said oscillator that might otherwise leak through to said audio amplifier.

* * * * *